US011115280B2

(12) United States Patent
Shao et al.

(10) Patent No.: US 11,115,280 B2
(45) Date of Patent: *Sep. 7, 2021

(54) DATA-DRIVEN IDENTIFICATION OF FEATURES RELATED TO A STATE CHANGE OF A NETWORK COMPONENT

(71) Applicant: Cisco Technology, Inc., San Jose, CA (US)

(72) Inventors: Wenqin Shao, Boulogne-Billancourt (FR); Frank Brockners, Cologne (DE); Parisa Foroughi, Paris (FR); Thomas Michel-Ange Feltin, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,723

(22) Filed: Feb. 13, 2020

(65) Prior Publication Data

US 2021/0092010 A1 Mar. 25, 2021

Related U.S. Application Data

(60) Provisional application No. 62/903,331, filed on Sep. 20, 2019.

(51) Int. Cl.
*H04L 12/24* (2006.01)
(52) U.S. Cl.
CPC ........ *H04L 41/085* (2013.01); *H04L 41/0866* (2013.01)
(58) Field of Classification Search
CPC .......................... H04L 41/085; H04L 41/0866
See application file for complete search history.

(56) References Cited

U.S. PATENT DOCUMENTS 8,774,023 B2 7/2014 Wang et al.
9,942,253 B2 4/2018 Freedman et al.
(Continued)

OTHER PUBLICATIONS

Miao Zhang, Chris Ding, Ya Zhang, and Feiping Nie. 2014. Feature selection at the discrete limit. In Proceedings of the Twenty-Eighth AAAI Conference on Artificial Intelligence (AAAI'14). AAAI Press, 1355-1361. (Year: 2014).*

(Continued)

*Primary Examiner* — John M Macilwinen
(74) *Attorney, Agent, or Firm* — Lee & Hayes, P.C.

(57) ABSTRACT

Techniques and mechanisms for automatically identifying counters/features of a network component that are related to a state change (or event) for the network component or for the network itself. For example, using data obtained from the network component around a time of the state change, delta averages for the features around the time of the state change may be determined. The delta averages may be utilized to determine which counters/features are most descriptive for a particular state change. The counter/features that are the most descriptive for a particular state change is as important as the change detection itself. This is especially true since in a case of an event/state change occurring, a large amount of counters/features may react to the state change or event. Thus, the techniques described herein provide for an approach to distill which counters/features contribute the most to a particular state change from a data driven perspective.

20 Claims, 5 Drawing Sheets

(56) References Cited

U.S. PATENT DOCUMENTS

| | | | |
|---|---|---|---|
| 2004/0148266 A1* | 7/2004 | Forman | G06F 16/353 |
| | | | 706/46 |
| 2012/0069747 A1* | 3/2012 | Wang | H04L 41/082 |
| | | | 370/252 |
| 2015/0074035 A1* | 3/2015 | Narasappa | G06N 7/005 |
| | | | 706/52 |
| 2018/0314726 A1 | 11/2018 | Bath et al. | |
| 2019/0163678 A1 | 5/2019 | Bath et al. | |
| 2020/0053108 A1* | 2/2020 | Cili | G06F 11/0781 |

OTHER PUBLICATIONS

Norris, G.A. The requirement for congruence in normalization. Int. J. LCA 6, 85. (Year: 2001).*

Valdivieso Caragua, Angel Leonardo, et al., "Monitoring and Discovery for Self-Organized Network Management in Virtualized and Software Defined Networks," Sensors 2017, www.mdpi.com/journal/sensors, published Mar. 31, 2017, pp. 1-31.

\* cited by examiner

400 ↘

```
┌─────────────────────────────────────────────────────────────────────────┐
│ BASED AT LEAST IN PART ON A STATE CHANGE AT A NETWORKING COMPONENT,     │
│ OBTAIN DATA RELATED TO VALUES OF A PLURALITY OF FEATURES OF THE         │
│ NETWORKING COMPONENT, THE DATA BEING WITHIN A WINDOW DURING WHICH       │
│ THE STATE CHANGE OCCURRED                                               │
│                                   402                                   │
└─────────────────────────────────────────────────────────────────────────┘
                                    ↓
┌─────────────────────────────────────────────────────────────────────────┐
│           EVALUATE THE DATA WITH RESPECT TO CHANGES IN THE VALUES       │
│                                   404                                   │
└─────────────────────────────────────────────────────────────────────────┘
                                    ↓
┌─────────────────────────────────────────────────────────────────────────┐
│ BASED AT LEAST IN PART ON THE EVALUATING THE DATA, DETERMINE A LIST OF  │
│ THE PLURALITY OF FEATURES HAVING LARGEST CHANGES IN VALUES, WHEREIN     │
│ THE LIST REPRESENTS MOST LIKELY FEATURES CONTRIBUTING TO THE STATE      │
│ CHANGE OF THE NETWORKING COMPONENT                                      │
│                                   406                                   │
└─────────────────────────────────────────────────────────────────────────┘
                                    ↓
┌─────────────────────────────────────────────────────────────────────────┐
│                     PROVIDE THE LIST MAY TO A USER                      │
│                                   408                                   │
└─────────────────────────────────────────────────────────────────────────┘
```

FIG. 4

DATA-DRIVEN IDENTIFICATION OF FEATURES RELATED TO A STATE CHANGE OF A NETWORK COMPONENT

PRIORITY CLAIM AND CROSS-REFERENCE TO RELATED APPLICATIONS

This Application is a non-provisional of, and claims priority under 35 USC § 119(e), to U.S. Provisional Patent Application No. 62/903,331, filed Sep. 20, 2019, which is fully incorporated by reference herein as if fully set forth below.

TECHNICAL FIELD

The present disclosure relates generally to automatically identifying features related to a state change of a network component based on a data driven network event description using delta averages.

BACKGROUND

In computer networking, many network components, e.g., routers, servers, switches, etc., handle large amounts of data signals. For example, a router may route large amounts of data signals throughout the network and/or in and out of the network. Today, many of the routers include well above 100,000 counters or features.

When a state change or event occurs within the router or the network, a set of counters/features may be primarily responsible for the state change or may be most affected by the state change. However, the sheer volume of counters/features of the router makes such determination difficult. Currently, understanding the state of a router generally involves a domain expert (e.g., network engineer) that interprets a selected set of operational data retrieved through simple network management protocol (SNMP), command-line interface (CLI), etc. Currently, such network engineers often choose which operational counters are monitored up front for operational data. This limits monitoring/analysis of a number of counters/features that may react to state changes and thus, makes it difficult to determine which counter/features are related to the state change of the router.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for automatically identifying counters/features of a network component that are related to a state change (or event) for a network component or for the network itself.

DESCRIPTION OF EXAMPLE EMBODIMENTS

Overview

Figure 1:
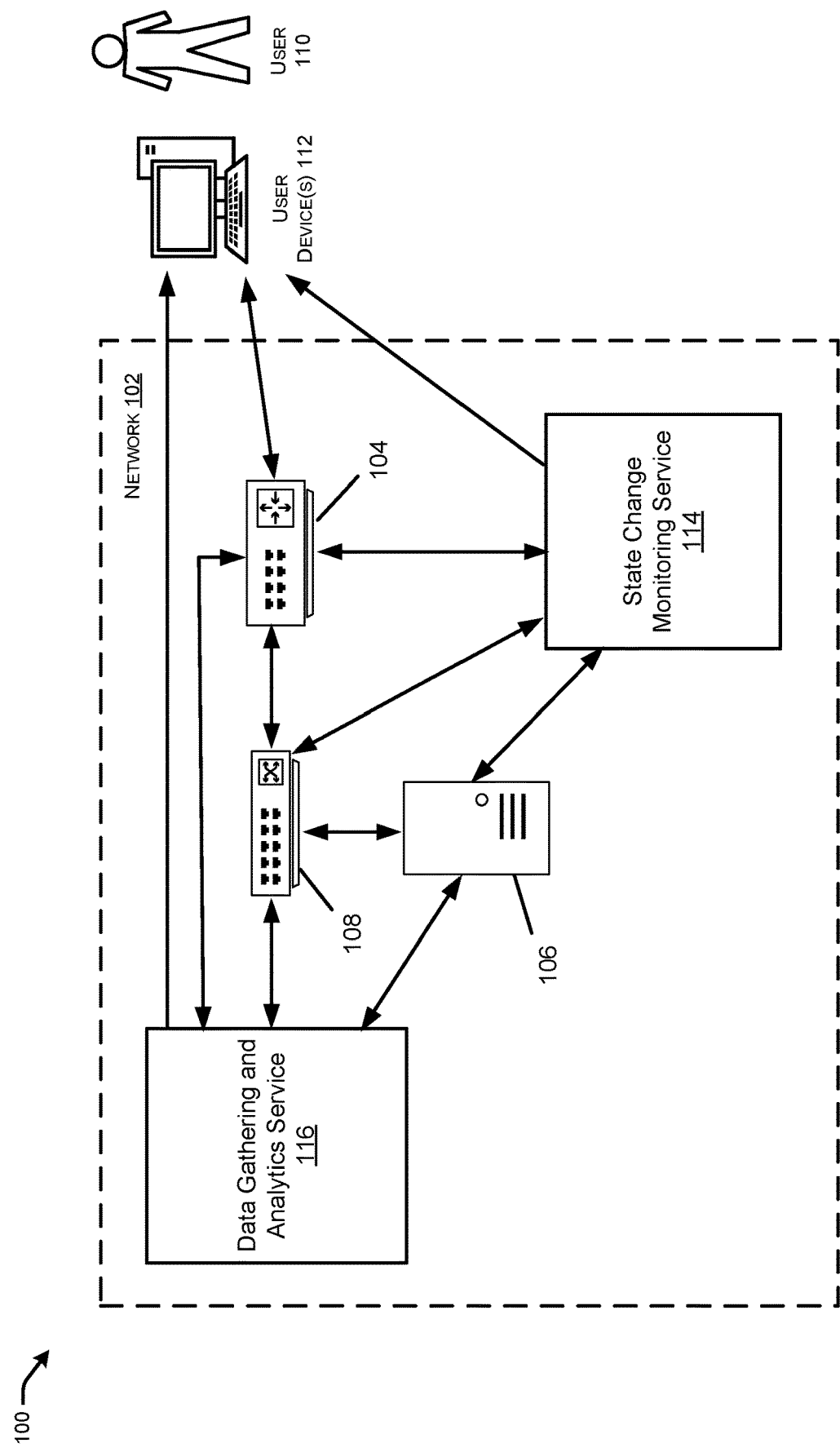
FIG. 1 schematically illustrates an example of schematically illustrates an example of a network that includes a state change monitoring service and a data gathering and analytics service.

This disclosure describes techniques for automatically identifying counters/features of a network component that are related to a state change (or event) for the network component or for the network itself. For example, using data obtained from the network component around a time of the state change, delta averages for the features around the time of the state change may be determined. The delta averages may then be utilized to determine which counters/features are most descriptive for a particular state change. The counter/features that are the most descriptive for a particular state change is as important as the change detection itself. This is especially true since in a case of an event/state change occurring, a large amount of counters/features may react to the state change or event. Thus, the techniques described herein provide for an approach to distill which counters/features contribute the most to a particular state change from a data driven perspective. Such an approach is inspired by the underlying logic of t-distributed stochastic neighbor embedding (t-SNE) to distill which counters/features contribute the most in a transition of one cluster of data to another cluster of data, e.g., from one state of the network component to another state of the device.

In particular, a method in accordance with techniques described herein may include obtaining, based at least in part on a state change at a networking component, e.g., a router, data related to values of a plurality of features of the networking component. In configurations, the plurality of features may undergo preprocessing before a t-SNE step to distill which counters/features contribute the most in a transition of one cluster of data to another cluster of data, e.g., from one state of the network component to another state of the device. The data is within a primary window of time during which the state change occurred. The data may be evaluated using a delta average based model, where the delta average based model evaluates the data within a first window of the primary window and a second window of the primary window. The first window includes first data of the data prior to occurrence of the state change, while the second window includes second data of the data after the occurrence of the state change.

Based at least in part on the evaluation of the data with the delta average based model, a change in mean values of the values for each feature of the plurality of features may be determined between the first window and the second window. Based at least in part on the change in mean values of the values for each feature of the plurality of features between the first window and the second window, a list of the plurality of features having the largest changes in mean values between the first window and the second window may be determined. The list may be based on a predetermined number of features, e.g., a threshold amount of features with the largest changes in mean values. Furthermore, the list represents the most likely features contributing to the state change of the networking component. The list of features may be provided to a user. The user may then use the list to determine necessary steps for rectifying the state change, if needed.

Additionally, the techniques described herein may be performed by a system and/or device having non-transitory computer-readable media storing computer-executable instructions that, when executed by one or more processors, performs the method described above.

EXAMPLE EMBODIMENTS

Model driven telemetry (MDT) generally makes gathering of operational data related to counter/features of a network component within a network, e.g., a router, available in a holistic and semantically consistent way through a collection of YANG models. Several mechanisms exist to automatically detect changes of the router state, ranging from simple threshold-based schemes based on a select set of models and corresponding counters/features to more sophisticated, multi-variant schemes as further described in an example herein.

Thus, once a state change has been determined for the router or the network by a state change monitoring service or component of the network, operational data related to counters/features of the router may be gathered by a data gathering and analytical service or component of the network. The router may be part of the network or be external to the network. The data gathering and analytical service may obtain data related to values of a plurality of counters/features of the router. As previously noted, there may be well over 100,000 counters/features of the router. For example, the counters/features (referred to herein as counters) may include traffic related counters, resource related counters (e.g., memory, central processing unit (CPU), ternary content-addressable memory (TCAM), queue, etc.), control plane counters (border gateway protocol (BGP) neighbors, prefix counts, etc.), etc. The operational data may be gathered within a primary window of time during which the state change occurred. The data may then be evaluated in order to model each counter's reaction to the state change as delta averages, e.g., a change in mean of two smaller windows, e.g., a first window before the state change or event occurred and a second window after the state change or event occurred. In configurations, a third of the data, e.g., a middle third of the data within the primary window, may be disregarded.

In configurations, once the delta averages for all counters for the primary window are calculated, the delta average for each counter may be sorted and ranked in a list that shows the contribution of features to a particular state change or event from a data driven perspective. Top ranking counter that contribute the most to a state change or event from a data driven perspective may then be provided to a user as indicating primary counters that may have contributed to the state change or event.

In other configurations, a relative mean may be used to sort the counters and create the list that shows the contribution of counters to a particular state change or event from a data driven perspective. In some situations, what is important is the relative step change for each counter rather than the step itself as used in the previously described technique with respect to delta averages. To determine the relative step change value for each counter, each step may be normalized by the max value of the two windows of values being considered. The absolute value of the normalized step change value for each counter is the final value for each counter. Based at least in part on the final values, the list that shows the contribution of counters to a particular state change or event from a data driven perspective may be created.

In configurations, variance may be used to sort the counters and create the list that shows the contribution of counters to a particular state change or event from a data driven perspective. Instead of considering the difference of mean values, the difference of the variance values may be considered. Thus, instead of disregarding the one third of the data, the variance for the whole window of size W around the event may be considered. This may provide another view of the changes that are reflected in the counters. Based at least in part on the final values related to variance, the list that shows the contribution of counters to a particular state change or event from a data driven perspective may be created.

In other configurations, a spike in the counter values may be used to create the list that shows the contribution of counters to a particular state change or event from a data driven perspective. The intuition behind using a "step" or "spike" roots back to the nature of data in question. As an example, comparing to periodic patterns such as sine and cosine may be useful for communication cases. Therefore, it does not necessarily need to be a spike but rather the shape of the data. When a change occurs, the spike is supposed to happen in the transition time of the counter. This means the windowing generally must be different compared to the other techniques described herein. While the step/delta averages technique previously mentioned uses a window of size W points, divides it into three parts, and disregards one third, for the spike calculation, all three parts of data are used for the spike technique.

In configurations, a distance to reference data behavior technique may be used to create the list that shows the contribution of counters to a particular state change or event from a data driven perspective may be created. With such a technique, reference shapes are defined. e.g., the shape of a perfect step or spike. For example, a half window of 0 with a half window of 1 (or the other way around) for a step and just a 0 right in the middle of all ones (or vice versa) for a spike may be defined. A norm2 distance of the references from the window around the event may be calculated, e.g., the squared 2-norm of all the distances around the event may be calculated. For each counter, the minimum of the resulting values from the distance to references may be used to create the list.

In configurations, more than one type of change may be considered in the assessment to create the list that shows the contribution of counters to a particular state change or event from a data driven perspective. Thus, the maximum of two or more of the various measuring techniques described herein may be considered, e.g., the step technique, the relative mean technique, the variance technique, the spike technique, and/or the distance to reference technique.

The choice of which technique to use is dependent on the type of data being used. Also, use cases for the data may influence the choice of which technique to use.

In configurations, the ranked list may be interpreted further. For example, in order to approach the root cause of a state change or event, certain counter/features may be excluded from the list. For example, traffic related counters may be excluded from the list. This is due to the fact that traffic related counters often react to changes of a router state. Thus, a pure change in traffic statistics does not lend to general conclusions from a networking engineering or troubleshooting perspective.

Thus, in particular, auto-provisioning of a MACSec session between two electronic devices within a network may include both electronic devices utilizing a discovery protocol. For example, if the LLDP is utilized, PDUs may be exchanged between the devices. The PDUs include TLVs, where one of the TLVs provides an indication of each devices' MACSec capabilities.

In configurations, the state change or event for the router may be determined by the state change monitoring service using a t-distributed stochastic neighbor embedding (t-SNE) that analyzes data related to values of the plurality of counters/features of the router. The data may be data obtained in a real time fashion or may be historical data gathered by the data gathering and analytical service prior to the occurrence of the state change or event. Another example of a technique that may be utilized by the state change monitoring service of the network includes a uniform manifold approximation and projection (UMAP) technique.

Thus, as can be seen, the counters/features of a network component may be analyzed upon detection of a state change of the network component or the network itself. The analysis may be automatically performed with respect to all counters/features of the network component to determine which counters/features were most likely the cause of the state change or event or were most affected by the state change or event. The analysis may be performed without intervention by a network engineer and without limiting the number of counters/features that are monitored and/or analyzed.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates example 100 of a network 102. The network 102 includes network components including, for example, one or more routers 104, one or more servers 106, and one or more switches 108. Other networking components may be included within or external to the network 102.

As may be seen, a user 110 utilizing a user device 112 may access the network 102. The user may be an individual or an entity, e.g., a business, a school, a charity, other type of organization, etc. The user device 112 may access the network 102 through the router 104. While the router 104 is illustrated as part of the network 102, in configurations, the router 104 may be external to the network 102. Generally, numerous user devices 112 may be accessing the network 112 at a given time. Thus, numerous user devices 112 may be accessing the router 104 at any given time. The numerous user devices 112 may all be part of the same user 110 or may be from different users. The user device 112 may be, for example, and without limitation, any one of a computer, a peripheral device such as, for example, a printer, a facsimile machine, etc., a mobile electronic device such as, for example, a smart phone, a laptop computer, a tablet, a notebook, etc.

A state change monitoring service 114 may monitor the router 104, server 106 and switch 108, as well as other network components of the network not illustrated (e.g., other routers, servers, switches, etc.), for state changes or events. When a state change or event occurs at one of the network components, e.g., router 104, the state change monitoring service 114 may detect the event. The event may be detected by the state change monitoring service 114 based upon real time data gathered by a data gathering and analytics service 116 of the network 102, or by the state change monitoring service 114 itself, from the router 104. In configurations, the state change monitoring service 114 and the data gathering and analytics service 116 may be a single service. In some configurations, the state change monitoring service 114 may detect the state change or event based upon historical data gathered by the data gathering and analytics service 116, or by the state change monitoring service 114 itself, from the router 104. While in this example a state change or event is detected in the router 104, the state change or event may be detected in the server 106, the switch 108, as well as other network components of the network 102 not illustrated.

Once the state change or event has been detected, for example, with respect to router 104, by the state change monitoring service 114, the data gathering and analytics service 116 may gather data during a window of time that includes the time at which the state change or event occurred. The data gathering and analytics service 116 may then analyze the data to determine delta averages for each counter/feature of the plurality of features for the router 104. The delta averages may be calculated with respect to a first, smaller window of the window of time, where the first window represents operational data for the counters/features of the router 104 prior to the occurrence of the state change or event, and a second window, smaller window of the window of time, where the second window includes operational data for the counters/features of the router 104 after the occurrence of the state change or event. The delta averages may represent changes in mean values for each counter/feature of the router 104 between the first window and the second window.

In particular, the delta averages approach takes advantage of the fact that the changes in the counters/features of the router 104 often present themselves as a change in the mean of the values. Thus, if a window w of points around the event is taken, each counter/feature's reaction to change may be modelled as a change in mean of two smaller windows before and after the event. For example, it is assumed a state change or event occurs at time t corresponding to the relative point in observations in a data-set as pc. The value of each feature i is noted as $v_k^i$ at point k within window w. The difference of average ("delta-average") for each counter/feature may be calculated with equation 1 as follows:

$$\forall f^i, \delta^i = \sum_{k=p_e-w/2}^{k=p_e-w/6} v_k^i - \sum_{j=p_e+w/6}^{j=p_e+w/2} v_j^i \qquad \text{Equation 1}$$

In configurations, some of the values may be eliminated from an upper end and a lower end of the window w based on predetermined criteria. For example, in Equation 1, ⅙ of the values at each end of the window w are eliminated. A reason for excluding w/6 points on either side of the state change or event is to eliminate a possible impact of the transition of the values itself. An amount of values other than ⅙ may be eliminated depending on user preference or configurations.

Calculating and subsequently sorting the delta-averages for all counters/features for a given time t at which a state change or event was detected results in a ranked list of counters/features that shows the contribution of counters/ features to a particular change from a data driven perspective. Top ranking features are deemed to have contributed the most to the state change or event from a data driven perspective. In configurations, the ranked list may be interpreted further. For example, in order to approach the root cause of a state change or event, certain counter/features may be excluded from the list. For example, traffic related counters may be excluded from the list. This is due to the fact that traffic related counters often react to changes of a router state. Thus, a pure change in traffic statistics does not lend to general conclusions from a networking engineering or troubleshooting perspective. While equation 1 has been provided as an example of calculating delta averages, e.g., mean changes in values, other techniques and/or equations may be used depending on user preference and/or configurations.

In configurations, a relative mean may be used to sort the counters/features and create the list that shows the contribution of counters/features to a particular state change or event from a data driven perspective. In some situations, what is important is the relative step change for each counter/feature value rather than the step itself. To determine the relative step change value for each counter/feature, each step may be normalized by the maximum value of the two windows of values being considered in the primary window w. The absolute value of the normalized step change value for each counter/feature is the final value for each counter/feature. Based at least in part on the final values, the list that shows the contribution of counters/features to a particular state change or event from a data driven perspective may be created.

In other configurations, variance may be used to sort the counters/features and create the list that shows the contribution of counters/features to a particular state change or event from a data driven perspective. Instead of considering the difference of mean values, the difference of the variance values may be considered. Thus, instead of disregarding one third of the data, the variance for the whole window of size w around the event may be considered. Assuming the variance of the window w taken around the event is indicated by $\partial^i$, this may provide another view of the changes that are reflected in the counters.

$$\forall f^i \delta^i = \partial^i \qquad \text{Equation 2}$$

Based at least in part on the final values related to variance, the list that shows the contribution of counters/features to a particular state change or event from a data driven perspective may be created.

In configurations, a spike in the counter/feature values may be used to create the list that shows the contribution of counters/features to a particular state change or event from a data driven perspective. The intuition behind using a "step" or "spike" roots back to the nature of data in question. As an example, comparing to periodic patterns such as sine and cosine may be useful for communication cases. Therefore, it does not necessarily need to be a spike but rather the shape of the data. When a change occurs, the spike is supposed to happen in the transition time of the counter/feature. This means the windowing generally must be different compared to the other techniques described herein. While the step/delta averages technique previously mentioned uses a window of size w points, divides it into three parts, and disregards one third, for the spike calculation, all three parts of data are used for the spike technique. In particular, if for a counter/feature i, the mean of the first and third parts of data are respectively $m_1^i$, $m_3^i$ and the min and max of the middle third is indicated by $l_2^i$ and $h_2^i$ the spike value may be calculated as follows:

$$\forall f^i \delta^i = |\max(l_2^i \times l_2^i - m_1^i \times m_3^i, h_2^i \times h_2^i - m_1^i \times m_3^i)| \qquad \text{Equation 3}$$

In configurations, a distance to reference data behavior technique may be used to create the list that shows the contribution of counters/features to a particular state change or event from a data driven perspective may be created. With such a technique, reference shapes are defined. e.g., the shape of a perfect step or spike for counter/feature values. For example, a half window of 0 with a half window of 1 (or the other way around) for a step and just a 0 right in the middle of all ones (or vice versa) for a spike may be defined. A norm2 distance of the references from the window around the event may be calculated, e.g., the squared 2-norm of all the distances around the event may be calculated. For each counter/feature, the minimum of the resulting values from the distance to references may be used to create the list that shows the contribution of counters/features to a particular state change or event from a data driven perspective may be created.

In configurations, more than one type of change may be considered in the assessment to create the list that shows the contribution of counters/features to a particular state change or event from a data driven perspective. Thus, the maximum of two or more of the various measuring techniques described herein may be considered, e.g., the step technique, the relative mean technique, the variance technique, the spike technique, and/or the distance to reference technique. For example, the maximum of the spike technique and the step technique may be used to create the list that shows the contribution of counters/features to a particular state change or event from a data driven perspective.

$$\forall f^i \delta^i = \max(\delta_{spike}^i, \delta_{step}^i) \qquad \text{Equation 4}$$

The choice of which technique to use is dependent on the type of data being used. Also, use cases for the data may influence the choice of which technique to use.

Figure 2:
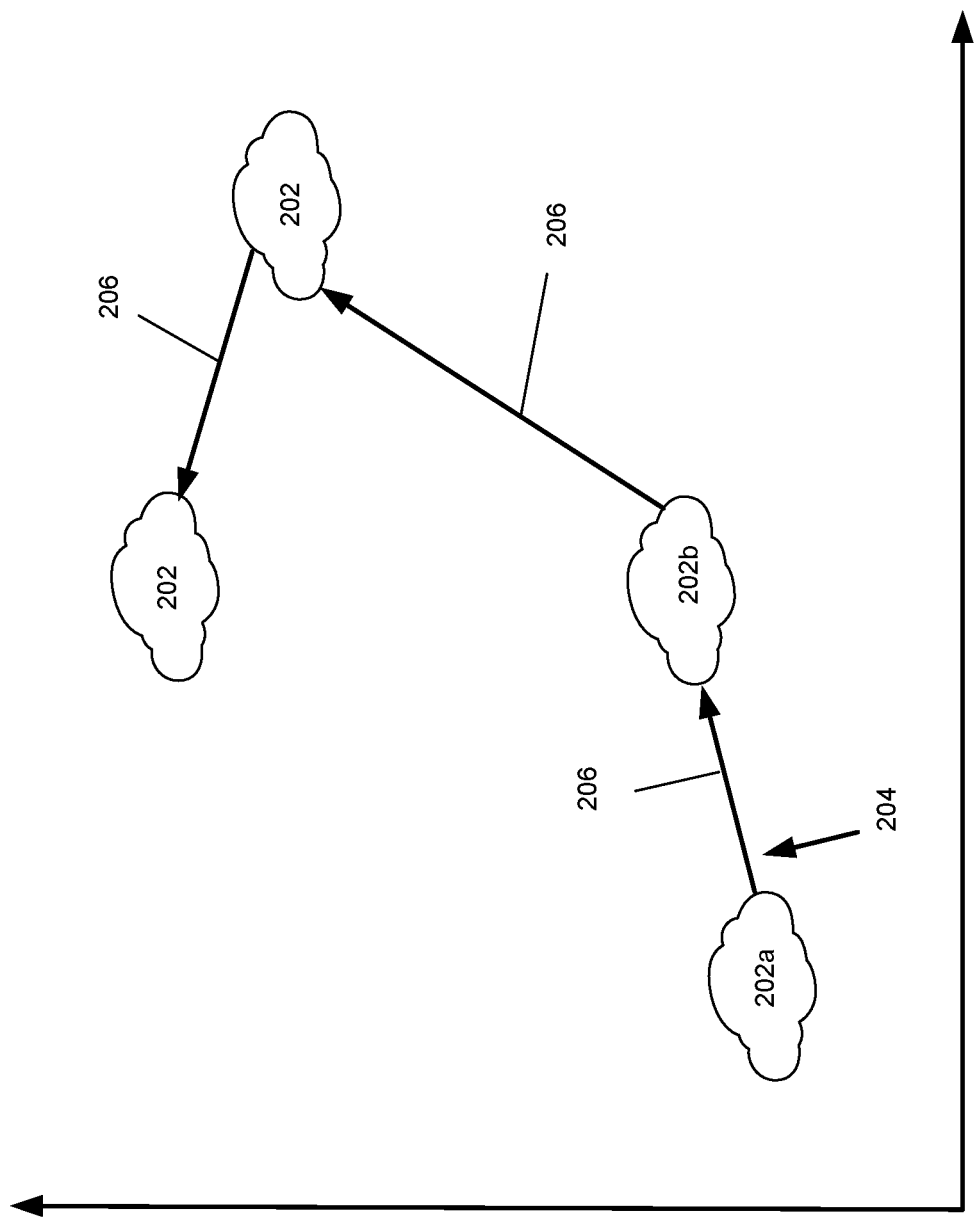
FIG. 2 schematically illustrates an example of analyzing gathered operational data of the various counters/features of a network component of FIG. 1 in order to detect the occurrence of a state change or event.

FIG. 2 illustrates an example 200 of analyzing gathered operational data of the various counters/features of a network component, e.g., router 104, in order to detect the occurrence of a state change or event. In the example of FIG. 2, the operational data is visualized as clusters using the T-SNE technique. Other techniques may be used to visualize the operational data, for example the UMAP technique.

The clusters 202 within FIG. 2 represent operational data for the various counters/features at a particular time. As the clusters 202 "move" in FIG. 2 with respect to time, the movement of the clusters 202 represents a state change or event has occurred with respect to the router 104. For example, by moving from cluster 202a to cluster 202b, a state change has occurred at 204 to cause the move from cluster 202a of operational data to cluster 202b of operational data. Thus, operational data may be analyzed around a window of time at 204 to determine delta averages as previously described for counters/features between 202a and 202b to determine a list of features that are most related to the state change that occurred between 202a and 202b.

As previously noted, FIG. 2 illustrates a t-SNE visualization of a sample data-set. The data-set reveals a set of clusters 202. Only "major changes," e.g., clusters 202 of operational data, seem to make the router 104's status, as represented by the lines 206, move to an entirely new position.

Figure 3:
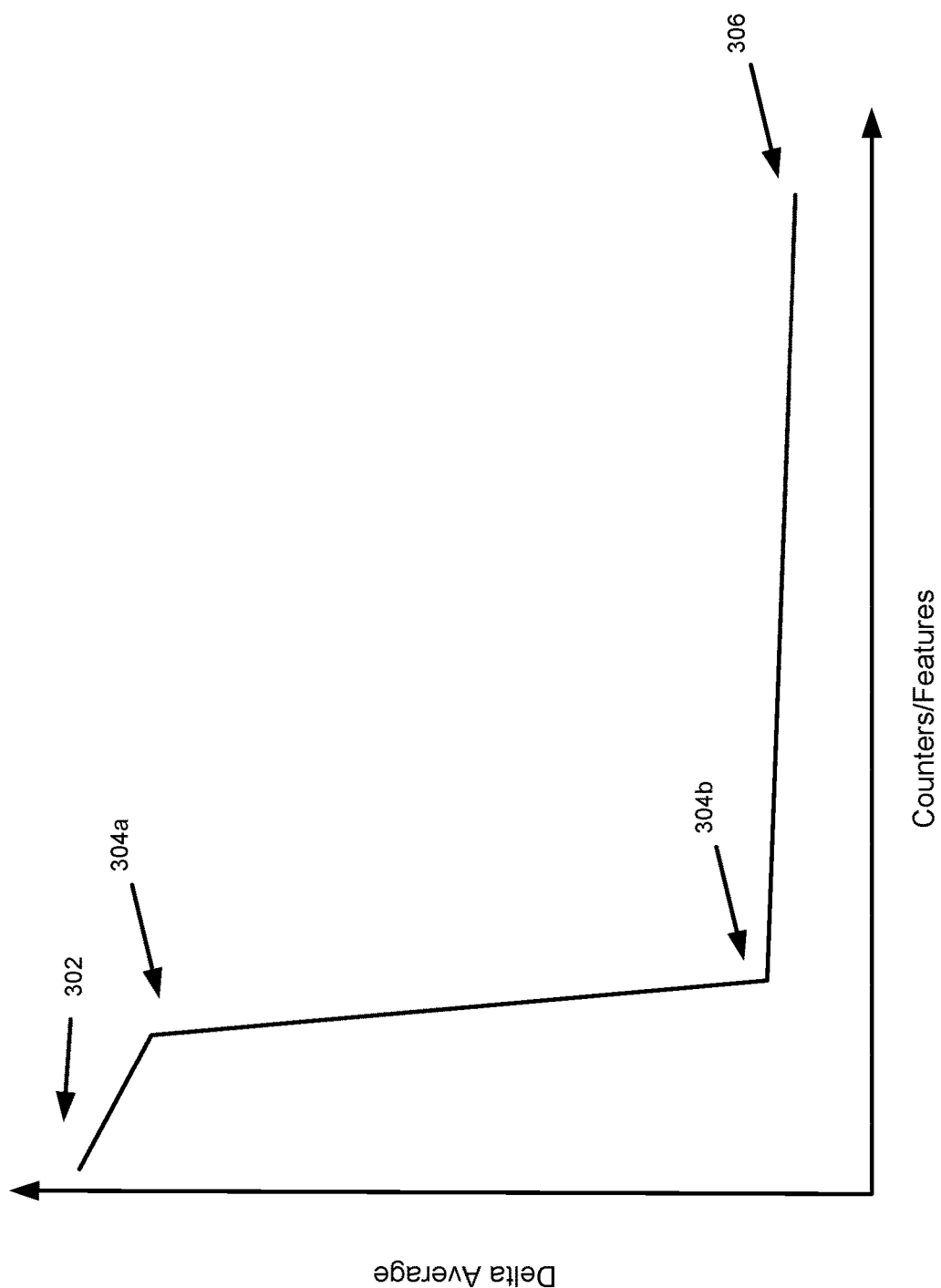
FIG. 3 graphically illustrates results of applying the delta averages approach and sorting/graphing the counters/features corresponding to their largest delta-averages.

Referring to FIG. 3, applying the delta averages approach described with respect to Equation 1 and sorting/graphing the counters/features corresponding to their largest delta-averages is shown. The results are for the example with respect to the transition from clusters 202*a* and 202*b*. As can be seen in FIG. 3, the counters/features between 302 and 304*a* have the largest delta averages and thus, are the biggest contributors to the state change or event between clusters 202*a* and 202*b* based on their large delta averages. As can be seen in FIG. 3, after the large drop-off in delta averages from 304*a* to 304*b*, from 304*b* to 306 the delta averages are relative stable, e.g., the same. Thus, in configurations, heuristics may be used to determine which of the counters/features have the largest delta averages and thus, are the biggest contributors to a state change or event based on their large delta averages.

In configurations, a threshold of the maximum number of counters/features may be predetermined, e.g., by the user 110. In such configurations, the counters/features with the highest delta averages may be selected as the biggest contributors to the state change or event until the threshold is reached. For example, the top 50 counters/features may be selected.

FIG. 4 illustrates a flow diagram of an example method 400 that illustrates aspects of the functions performed at least partly by the state change monitoring service 114 and data gathering and analytics service 116 as described in FIGS. 1-3. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in the FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for automatically identifying counters/features of a network component, e.g., router 104, that are related to a state change (or event) for the network component or for the network itself. In some examples, the techniques of method 400 may be performed by a data gathering and analytics service, e.g., data gathering and analytics service 116. In such examples, the data gathering and analytics service may comprise one or more hardware interfaces configured to send and receive packets of data in the network, one or more processors, and one or more non-transitory computer-readable media storing computer-executable instructions that, when executed by the one or more processors, cause the one or more processors to perform steps of method 400.

At 402, based at least in part on a state change at a networking component, data is obtained related to values of a plurality of features of the networking component, the data being within a window during which the state change occurred.

At 404, the data is evaluated with respect to changes in the values.

At 406, based at least in part on the evaluating the data, a list of the plurality of features having largest changes in values is determined, wherein the list represents most likely features contributing to the state change of the networking component.

At 408, the list may be provided to a user, e.g., the user 110. The list may be used to rectify the state change of the network component, if necessary.

Figure 5:
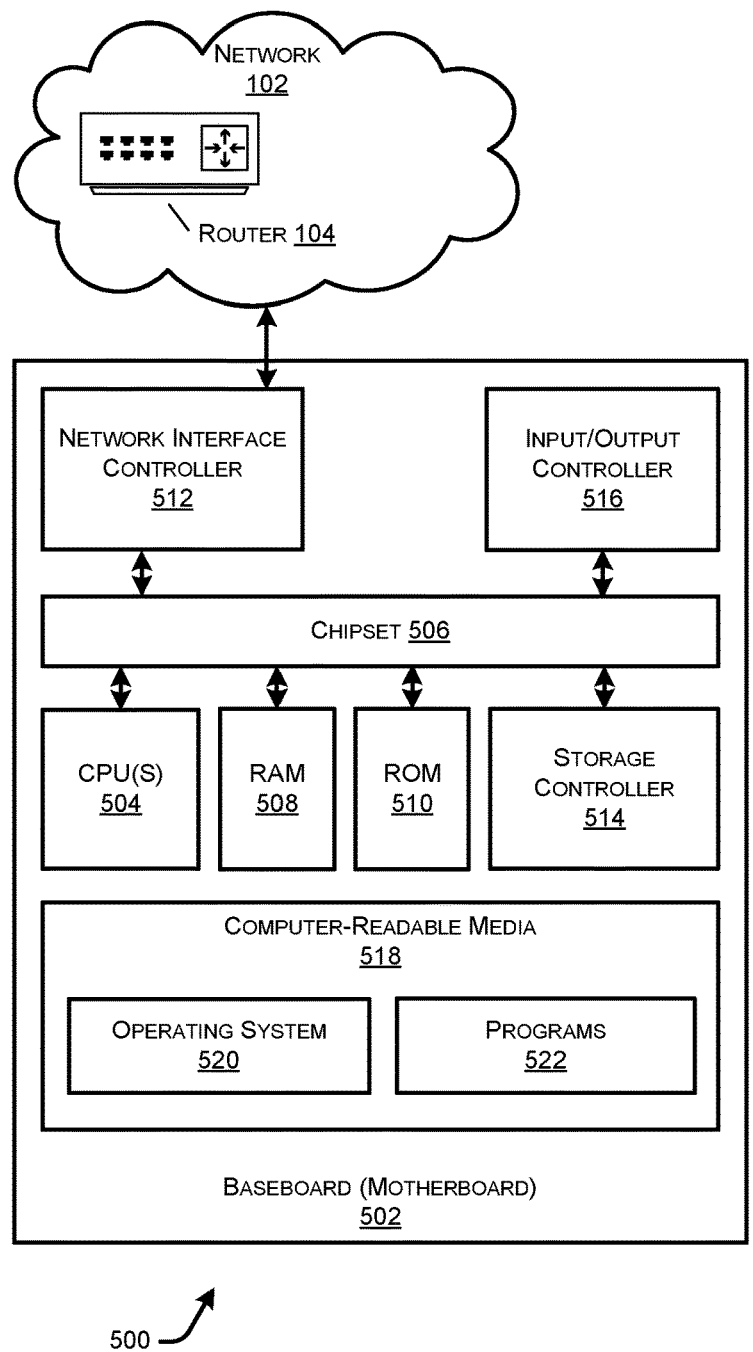
FIG. 5 is a computer architecture diagram showing an illustrative computer hardware architecture for implementing a state change monitoring service and a data gathering and/or analytics service that can be utilized to implement aspects of the various technologies presented herein.

FIG. 5 shows an example computer architecture for a computer 500 capable of executing program components for implementing the functionality described above. The computer architecture shown in FIG. 5 may be used to implement the data gathering and analytics service 116 and/or the state change monitoring service 114 for the router 104 in the network 102 described herein, and may comprise a conventional server computer, workstation, desktop computer, laptop, tablet, network appliance, e-reader, smartphone, or other computing device, and can be utilized to execute any of the software components presented herein. In some examples, however, the computer 500 may correspond to networked devices such as servers, switches, routers, hubs, bridges, gateways, modems, repeaters, access points, etc., and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network 102, and or any components included therein, may be supported by one or more devices similar to computer 500. Stated otherwise, some or all of the operations performed by the network 102, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The programs 522 may comprise any type of programs or processes to perform the techniques described in this disclosure for automatically identifying counters/features of a network component, e.g., router 104, that are related to a state change (or event) for the network component or for the network 104 itself. Generally, the programs 522 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
   based at least in part on a state change at a networking component, obtaining data related to values of a plurality of features of the networking component, the data being within a primary window during which the state change occurred;
   evaluating the data using a delta-average based model, the delta-average based model evaluating the data within (i) a first window of the primary window, the first window including first data of the data prior to occurrence of the state change and (ii) a second window of the primary window, the second window including second data of the data after the occurrence of the state change;
   based at least in part on the evaluating the data with the delta-average based model, determining a change in mean values of the values for each feature of the plurality of features between the first window and the second window;
   based at least in part on the determining the change in mean values of the values for each feature of the plurality of features between the first window and the second window, determining a list of the plurality of features having largest changes in mean values between the first window and the second window, wherein the list represents most likely features contributing to the state change of the networking component; and
   providing the list to a user.

2. The computer-implemented method of claim 1, further comprising:
   wherein evaluating the data with the delta-average based model comprises eliminating a predetermined amount of the values for each feature of the plurality of features within (i) the first window and (ii) the second window.

3. The computer-implemented method of claim 1, further comprising normalizing each value of the plurality of features by a maximum value of the first and second windows.

4. The computer-implemented method of claim 1, wherein evaluating the data comprises evaluating the data with respect to one or more of a difference in mean values of the features, a difference in variance of values of the features, a spike in values of the features, or a distance to reference data.

5. The computer-implemented method of claim 1, wherein the list includes a predetermined number of features determined by the user.

6. The computer-implemented method of claim 1, wherein the list includes a predetermined number of features based on heuristics.

7. The computer-implemented method of claim 1, further comprising:
   based on predetermined criteria, removing one or more features from the list.

8. The computer-implemented method of claim 1, wherein the networking component comprises one of a router, a server, or a switch.

9. One or more non-transitory computer-readable media storing computer-executable instructions that, when executed by one or more processors, cause the one or more processors to perform actions comprising:
   based at least in part on a state change at a networking component, obtaining data related to values of a plurality of features of the networking component, the data being within a primary window during which the state change occurred;
   evaluating the data using a delta-average based model, the delta-average based model evaluating the data within (i) a first window of the primary window, the first window including first data of the data prior to occurrence of the state change and (ii) a second window of the primary window, the second window including second data of the data after the occurrence of the state change;
   based at least in part on the evaluating the data with the delta-average based model, determining a change in mean values of the values for each feature of the plurality of features between the first window and the second window;
   based at least in part on the determining the change in mean values of the values for each feature of the plurality of features between the first window and the second window, determining a list of the plurality of features having largest changes in mean values between the first window and the second window, wherein the list represents most likely features contributing to the state change of the networking component; and
   providing the list to a user.

10. The one or more non-transitory computer-readable media of claim 9, further comprising:
    wherein evaluating the data with the delta-average based model comprises eliminating a predetermined amount of the values for each feature of the plurality of features within (i) the first window and (ii) the second window.

11. The one or more non-transitory computer-readable media of claim 9, wherein the actions further comprise normalizing each value of the plurality of features by a maximum value of the first and second windows.

12. The one or more non-transitory computer-readable media of claim 9, wherein evaluating the data comprises evaluating the data with respect to one or more of a difference in mean values of the features, a difference in variance of values of the features, a spike in values of the features, or a distance to reference data.

13. The one or more non-transitory computer-readable media of claim 9, wherein the actions further comprise:
    based on predetermined criteria, removing one or more features from the list.

14. The one or more non-transitory computer-readable media of claim 9, wherein the networking component comprises one of a router, a server, or a switch.

15. A computer-implemented method comprising:
    obtaining data related to values of a plurality of features of a router, the data being within a primary window during which a state change occurred, the state change relating to the router;
    evaluating the data with respect to one or more of a difference in mean values of the features, a difference in variance of values of the features, a spike in values of the features, or a distance to reference data, wherein the evaluating the data comprises
    evaluating the data using a delta-average based model, the delta-average based model evaluating the data within (i) a first window of the primary window, the first window including first data of the data prior to occurrence of the state change and (ii) a second window of the primary window, the second window including second data of the data after the occurrence of the state change;

based at least in part on the evaluating the data with the delta-average based model, determining a change in mean values of the values for each feature of the plurality of features between the first window and the second window;

based at least in part on the evaluating the data, determining a list of the plurality of features having at least largest changes in mean values, and one or more of largest variance of values of the features, largest spike in values of the features, or largest distance to reference data, wherein the list represents most likely features contributing to the state change of the router; and providing the list of the plurality of features to a user.

16. The computer-implemented method of claim 15, further comprising:

eliminating a predetermined amount of the values for each feature of the plurality of features within the window.

17. The computer-implemented method of claim 15, further comprising:

based on predetermined criteria, removing one or more features from the list.

18. The computer-implemented method of claim 15, wherein the list comprises a predetermined number of features determined by one of the user or heuristics.

19. The computer-implemented method of claim 15, further comprising:

normalizing each value of the plurality of features by a maximum value of the first and second windows.

20. The computer-implemented method of claim 15, wherein evaluating the data with the delta-average based model comprises eliminating a predetermined amount of the values for each feature of the plurality of features within (i) the first window and (ii) the second window.

* * * * *